US010868994B2

(12) United States Patent
Liu

(10) Patent No.: US 10,868,994 B2
(45) Date of Patent: *Dec. 15, 2020

(54) IMAGE SENSOR SYSTEM, AND RELATED TIMING CONTROL CIRCUIT AND CONTROL METHOD

(71) Applicant: TAIWAN SEMICONDUCTOR MANUFACTURING COMPANY LTD., Hsinchu (TW)

(72) Inventor: Chih-Min Liu, Hsinchu County (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/455,053

(22) Filed: Jun. 27, 2019

(65) Prior Publication Data

US 2020/0036928 A1 Jan. 30, 2020

Related U.S. Application Data

(63) Continuation of application No. 16/046,676, filed on Jul. 26, 2018, now Pat. No. 10,341,596.

(51) Int. Cl.
*H04N 5/376* (2011.01)
*H04N 5/378* (2011.01)

(52) U.S. Cl.
CPC .......... *H04N 5/3765* (2013.01); *H04N 5/378* (2013.01)

(58) Field of Classification Search
CPC .......................... H04N 5/3765; H04N 5/378
See application file for complete search history.

(56) References Cited

U.S. PATENT DOCUMENTS

| | | | | |
|---|---|---|---|---|
| 10,341,596 B1 * | 7/2019 | Liu | H04N 5/3765 | |
| 2012/0069229 A1 * | 3/2012 | Tewinkle | H04N 5/3765 | 348/294 |
| 2015/0281613 A1 * | 10/2015 | Vogelsang | H04N 5/378 | 348/300 |
| 2018/0081389 A1 * | 3/2018 | Wu | H04N 5/3765 | |

* cited by examiner

*Primary Examiner* — Nicholas G Giles
(74) *Attorney, Agent, or Firm* — WPAT, P.C., Intellectual Property Attorneys; Anthony King

(57) ABSTRACT

An image sensor system includes a timing control circuit, an image sensor and a modulation circuit. The timing control circuit is arranged to determine if a coding condition is fit according to an input signal and generate a control signal when the coding condition is fit. The input signal has a signal value updated in response to each pulse of a clock signal. The image sensor is coupled to the timing control circuit, and includes a plurality of pixels. One of the plurality of pixels receives the control signal from the timing control circuit and outputs a sensing signal. The modulation circuit is coupled to the image sensor, and arranged to receive the sensing signal and generate an output signal according to the sensing signal.

20 Claims, 6 Drawing Sheets

IMAGE SENSOR SYSTEM, AND RELATED TIMING CONTROL CIRCUIT AND CONTROL METHOD

PRIORITY CLAIM AND CROSS-REFERENCE

The present application is a continuation application of U.S. patent application Ser. No. 16/046,676 filed on Jul. 26, 2018, which is incorporated herein by reference in its entirety.

BACKGROUND

For a Complementary Metal-Oxide-Semiconductor (CMOS) image sensor (CIS), some typical circuits such like a slop Analog-to-Digital converter, or a ramp generator which has big size and is shared with multi-columns to readout large array in parallel is not preferred for a readout circuit of the CIS in a miniature size application, for example, a scribe line testing application or an Internet of Thing application. In addition, a typical CIS requires a plurality of timing control signals to control column and row circuit function, and each signal needs a lot of registers to implement a rising event or a falling event. However, this architecture involving a lot of registers lacks of flexibility and limits the capability. Therefore, a novel architecture is desired to solve the aforementioned problem.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
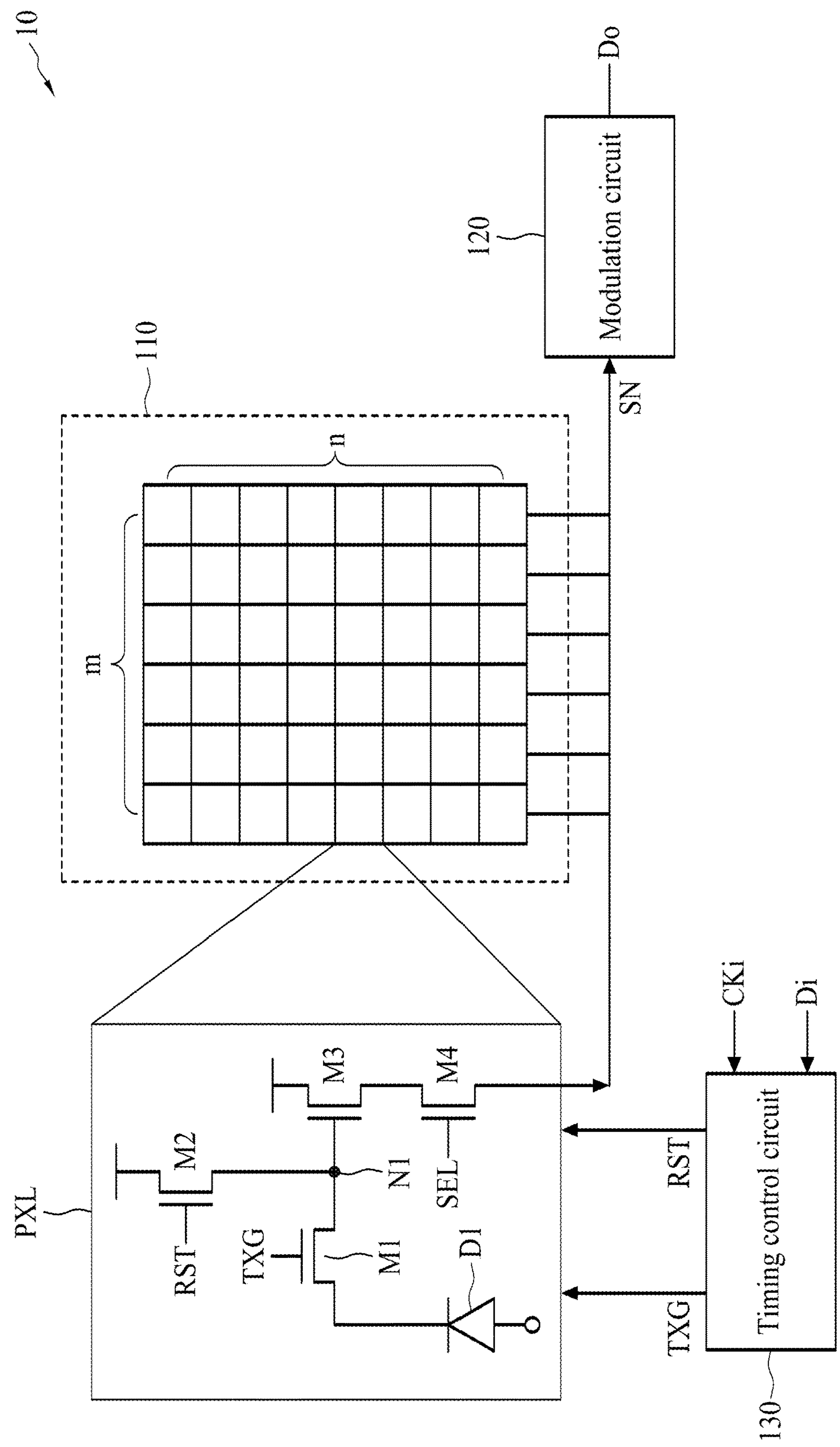
FIG. 1 is a diagram illustrating an image sensor system according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a diagram illustrating an image sensor system 10 according to an embodiment of the present disclosure. As shown in FIG. 1, the image sensor system 10 includes an image sensor 110, a modulation circuit 120 and a timing control circuit 130. The image sensor 110 includes a plurality of pixels arranged in a plurality of columns and a plurality of rows. In this embodiment, the plurality of pixels of the image sensor 110 is arranged in m columns and n rows in FIG. 1, where m and n are both positive integers. It should be noted that the values of m and n are not a limitation of the present disclosure. A pixel PXL of the plurality of pixels in the image sensor 110 is shown in FIG. 1 for reference, wherein the pixel PXL includes a diode D1, transistors M1-M4 and a control node N1. The diode D1 may be a photon diode applied to the image sensor 110. The transistor M1 is configured as a switch controlled by a gate control signal TXG, and the charge stored on the diode D1 is transferred to the control node N1 when the transistor M1 is activated. The transistor M2 is configured as a reset circuit controlled by a reset control signal RST, and the control node is reset to a reference voltage VDD when the transistor M2 is activated. In addition, the transistor M4 is configured as a selecting circuit controlled by a selecting signal SEL, and the pixel PXL is selected when the transistor M4 is activated. Each of the plurality of pixels in the image sensor 110 outputs a sensing signal SN to the modulation circuit 120 when selected, wherein the sensing signal SN is an analog signal which represents the sensed value of the pixel. As those skilled in the art should readily understand the operation of the pixel PXL in the image sensor 110, the detailed description is omitted for brevity.

The modulation circuit 120 is arranged to receive the sensing signal SN, and execute a modulation operation upon the sensing signal SN to output an output signal Do. In this embodiment, the modulation operation is an oversampling operation, that is, the frequency of the output signal Do is higher than the sensing signal SN, and such operation also modulate the noise to a higher frequency band. Therefore, the output signal Do is optionally coupled to a noise filter (not shown in FIG. 1) to filter the noise. It should be noted that, the output signal Do is a digital signal including one bit, that is, for each pixel being selected, the image sensor system 10 proposed by this embodiment outputs a digital signal. Therefore, the readout circuit of the image sensor system 10 does not need a plurality of analog-to-digital converters (ADCs) or a plurality of ramp generators arranged in parallel to read the value of each column or each row of the image sensor. The architecture proposed by the embodiment of FIG. 1 consumes less chip area, and is more preferred for a small size application such like a scribe line testing or Internet of Thing (IoT).

The timing control circuit 130 is arranged to receive an input signal Di and a clock signal CKi, and determine if a coding condition is fit according to the input signal. The timing control circuit 130 is further arranged to generate the gate control signal TXG and the reset control signal RST when the coding condition is fit. The input signal Di is a digital signal including a plurality of bits serially input to the timing control circuit 130, and each bit of the plurality of bits corresponds to each pulse of the clock signal CKi. In other words, the logic value of the input signal Di is updated for every pulse of the clock signal CKi. In this embodiment, the input signal Di is generated by a testing machine (not shown in FIG. 1) installed outside the image sensor system 10. However, this is not a limitation of the present disclosure. The detail of the modulation circuit 120 and the timing control circuit 130 is described in the following paragraphs.

Figure 2:
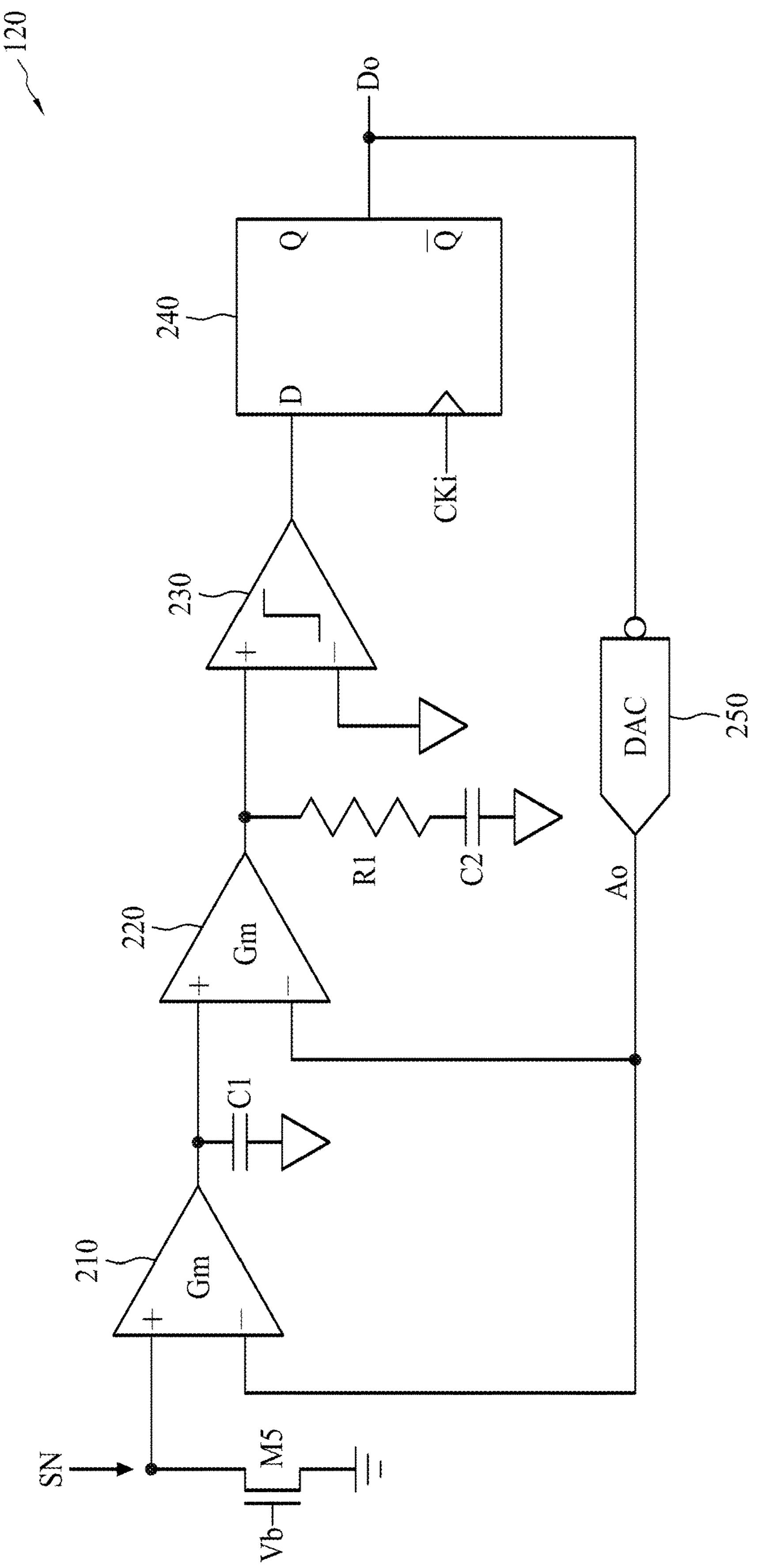
FIG. 2 is a diagram illustrating a modulation circuit of the image sensor system according to an embodiment of the present disclosure.

FIG. 2 is a diagram illustrating the modulation circuit 120 of the image sensor system 10 according to an embodiment of the present disclosure. In this embodiment, the modulation circuit 120 is implemented by a continuous time delta sigma modulator (CT-DSM). As shown in FIG. 2, the modulation circuit 120 includes a transistor M5, capacitors C1 and C2, a resistor R1, amplifiers 210 and 220, a comparator 230, a latch 240 and a 1-bit digital-to-analog converter (DAC) 250, wherein the amplifier 210 and 220 and the 1-bit DAC 250 constitute a two stages integrator. More specifically, the difference of the sensing signal SN and an output Ao of the 1-bit DAC 250 are amplified by the amplifiers 210 and 220, wherein the gain of the amplifier 210 is $$\frac{Gm}{C1}$$

while the gain of the amplifier 220 is $$\frac{Gm}{R1 * C2},$$

and the output of the amplifier 220 is received by the comparator 230 to compare with an common voltage. When the integrated result (i.e. the output of the amplifier 220) is greater than the common voltage, the latch 240 receives a logic high (e.g. the logic value '1') as the output signal Do. As a result, the feedback generated by the 1-bit DAC 250 grows inversely, and the output signal Do turns into logic low (e.g. the logic value '0'). During this process, the quantization noise is modulated to a higher frequency band. As mentioned above, the modulation circuit 120 is optionally coupled to a filter to filter the noise out. However, the architecture of the modulation circuit 120 is not a limitation of the present disclosure. In other embodiments, the modulation circuit 120 may be implemented by a Pulse Width Modulation (PWM) circuit or any other modulator generating a digital output signal including one bit. These alternative designs shall fall within the scope of the present disclosure.

Figure 3:
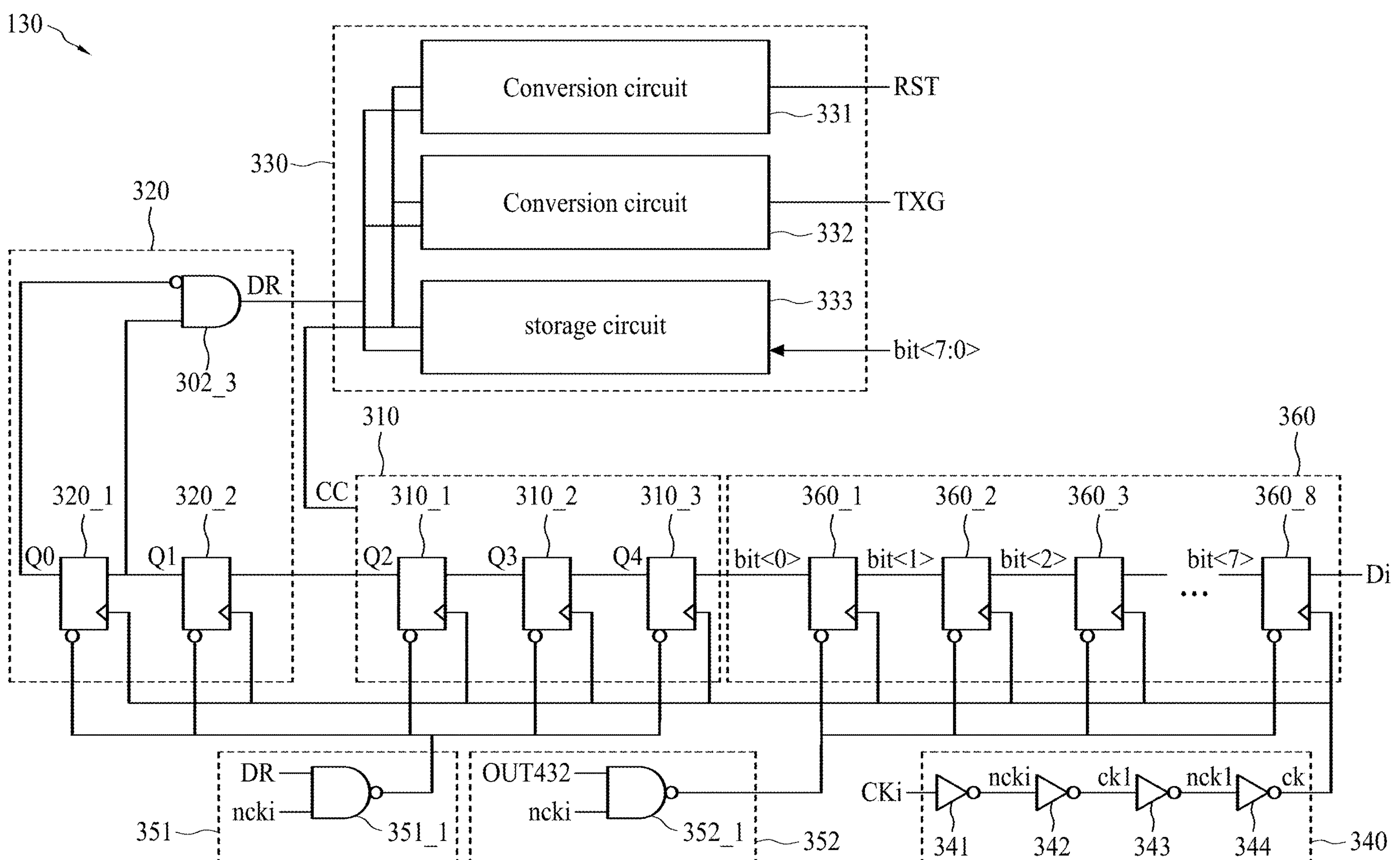
FIG. 3 is a diagram illustrating a timing control circuit of the image sensor system according to an embodiment of the present disclosure.

FIG. 3 is a diagram illustrating the timing control circuit 130 of the image sensor system 10 according to an embodiment of the present disclosure. As shown in FIG. 3, the timing control circuit 130 includes a latching circuit 310, a detecting circuit 320 and a logic circuit 330, a clock signal generating circuit 340, and reset circuits 351 and 352. The clock signal generating circuit 340 is arranged to receive the clock signal CKi, and generate delayed clock signals ncki, ck1, nck1 and ck by delaying the clock signal CKi with a plurality of inverters 341-344 included in the clock signal generating circuit 340. However, the number of the inverters and the number of the clock signals generated by the clock signal generating circuit 340 are not a limitation of the present disclosure. In other embodiment, the clock signal CKi may be directly connected to the other circuits in the timing control circuit 130 without being delayed. Those skilled in the art should readily understand the implementation of the clock signal generating circuit 340. In addition, the timing control circuit 130 further includes a register circuit 360. The register circuit 360 includes a plurality of registers 360_1-360_8, and each of the plurality of registers 360_1-360_8 is implemented by a D flip flop, wherein the number of the registers included in the register circuit 360 is not a limitation of the present disclosure, and the outputs of the registers 360_1-360_8 are marked as bit<0>, bit<1>, bit<2>, bit<3>, bit<4>, bit<5>, bit<6>, and bit<7>, respectively. Each of the plurality of registers in the register circuit 360 is arranged to receive the input signal Di in response to each pulse of the clock signal ck. That is, for each pulse of the clock signal ck being generated, the input signal Di is updated and the previous value is shifted to the next register of the register circuit 360. For example, when values of the input signal Di in response to 8 pulses of the clock signal ck is Di[8]=[0,0,0,1,1,1,0,1], These eight bits of the input signal Di are serially input to the registers 360_1-360_8, that is, the register 306_1-306_8 store [0,0,0,1,1,1,0,1] at their outputs as bit<0>, bit<1>, bit<2>, bit<3>, bit<4>, bit<5>, bit<6>, and bit<7>, respectively. As those skilled in the art should readily understand the operation of the register circuit 360 being triggered by the clock signal ck, the detailed description is omitted here. In this embodiment, the outputs of the register 360_1-360_8 (i.e. bit<7:0> marked in FIG. 3) are regarded as a data package of the input signal Di. After the clock signal ck keeps keying in, the input signal Di keep updating and the values of the outputs of the registers 360_1-360_8 are shifted to the latching circuit 310 and further to the detecting circuit 320. The detecting circuit 320 includes register 320_1-320_2 and the latching circuit 310 includes registers 310_1-310_3. In other words, the detecting circuit 320 is arranged to receive the input signal Di in response to two pulses of the clock signal ck (or two consecutive bits of the input signal Di), and the latching circuit 310 is arranged to receive the input signal in response to three pulses of the clock signal ck (or three consecutive bits of the input signal Di). As shown in FIG. 3, the outputs of the register 320_1-320_2 of the detecting circuit 320 and the registers 310_1-310_3 of the latching circuit 310 are marked as Q0, Q1, Q2, Q3 and Q4, respectively.

The detecting circuit 320 further includes an AND gate 320_3 which receives the inverse of the output Q0 and the output Q1, and generates a detecting result DR accordingly, wherein the detecting result DR indicates whether the coding condition is fit. In this embodiment, when the values of the outputs Q0 and Q1 are [0,1], the detecting result DR is a logic value '1' which indicates that the coding condition is fit. On the other hand, the logic values stored at the registers 310_1-310-3, i.e. the outputs Q2-Q4 are regarded as a control code CC. When the detecting result DR indicates that the coding condition is fit (i.e. the detecting result DR is logic value '1'), each of conversion circuits 331 and 332, which is included in the logic circuit 330 and is triggered by the detecting result DR, executes a conversion operation upon the control code CC (i.e. the outputs Q2-Q4) currently stored at the latching circuit 310 to generate the reset control signal RST and the gate control signal TXG, respectively. For example, when the coding condition is fit and the control code CC is a code instructing a rising event of the reset control signal RST, the conversion circuit 331 executes the conversion operation upon the control code CC to pull up the reset control signal RST to the logic high (i.e. the logic value '1') from the logic low (i.e. the logic value '0'). For another example, when the coding condition is fit and the control code CC is a code instructing a falling event of the gate control signal TXG, the conversion circuit 332 executes the conversion operation upon the control code CC to pull down the gate control signal TXG to the logic low (i.e. the logic value '0') from the logic high (i.e. the logic value '1'). In addition, the logic circuit 330 further includes a storage circuit 333, wherein the storage circuit 333 is triggered by the detect result DR and arranged to receive the control code CC and the outputs of the registers 360_1-360_8 (i.e. bit<7:0> marked in FIG. 3). When the detect result DR indicates that coding condition is fit and the control code CC is a code instructing a store operation, the storage circuit 333 stores the outputs of the registers 360_1-360_8 (i.e. bit<7:0> marked in FIG. 3) in another register, wherein the register may or may not be implemented in the logic circuit 330 which is not a limitation of the present disclosure.

Figure 4:
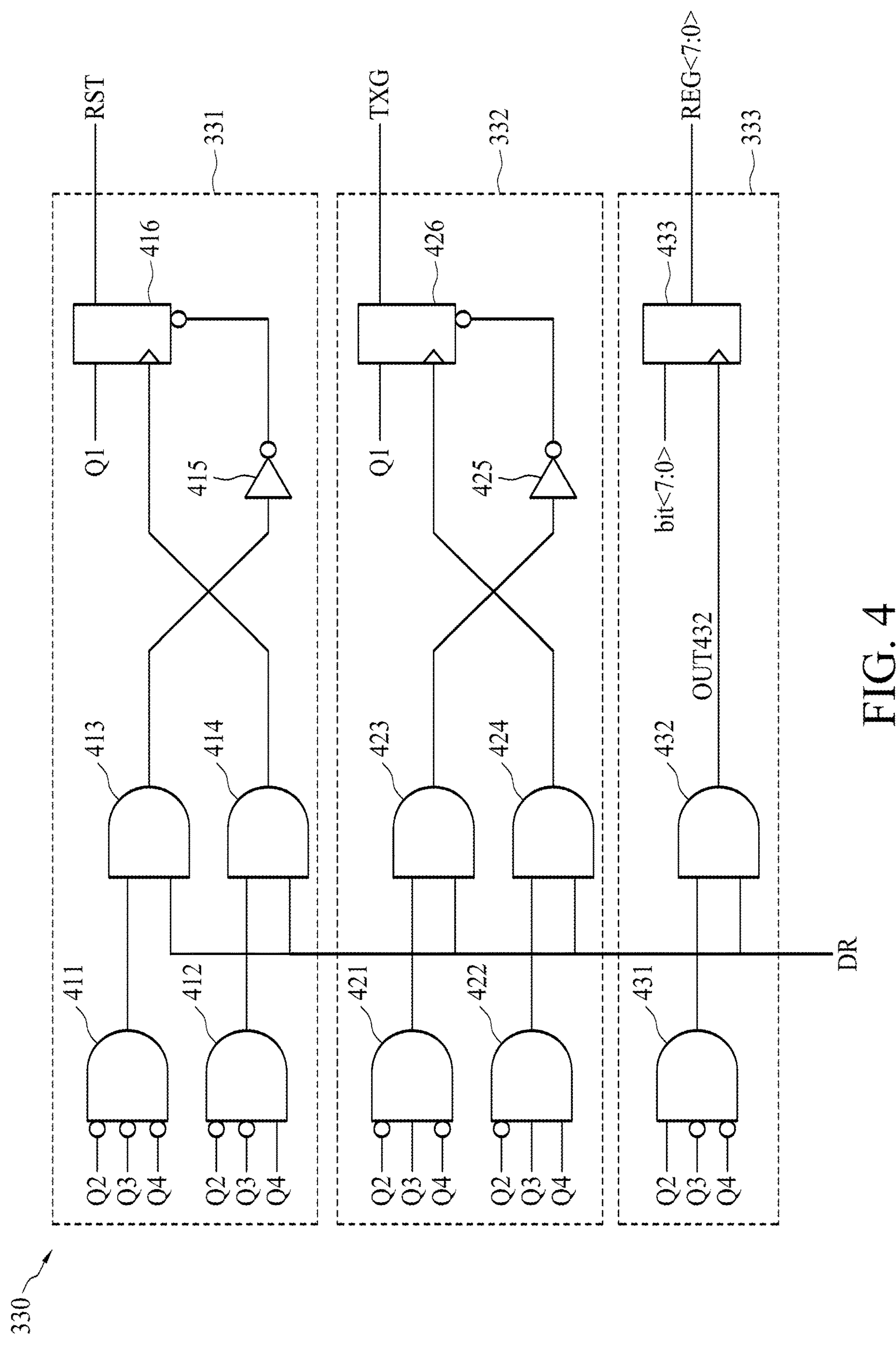
FIG. 4 is a diagram illustrating conversion circuits and a storage circuit of the logic circuit according to an embodiment of the present disclosure.

FIG. 4 is a diagram illustrating the conversion circuits 331 and 332 and the storage circuit 333 of the logic circuit 330 according to an embodiment of the present disclosure. The conversion circuit 331 includes AND gates 411, 412, 413 and 414, an inverter 415, and a D flip flop 416. As shown in FIG. 4, the AND gate 411 receives the inverse of the outputs Q2-Q4 while the AND gate 412 receives the inverse of the outputs Q2 and Q3 and the output Q4. The AND gate 413 receives the output of the AND gate 411 and the detecting result DR while the AND gate 414 receives the output of the AND gate 412 and the detecting result DR. The D flip flop 416 is triggered by the output of the AND gate 414 and is reset by the output of the AND gate 413. When the coding condition is fit (i.e. the detecting result DR is logic value '1') and the control code CC (Q2, Q3, Q4) is a code instructing a falling event of the reset control signal RST (in this embodiment, the control code (Q2, Q3, Q4)=(0,0,0)), the conversion circuit 331 pulls down the reset control signal RST to the logic low (i.e. the logic value '0'). On the other hand, When the coding condition is fit (i.e. the detecting result DR is logic value '1') and the control code (Q2, Q3, Q4) is a code instructing a rising event of the reset control signal RST (in this embodiment, the control code (Q2, Q3, Q4)=(0,0,1)), the conversion circuit 331 pulls up the reset control signal RST to the logic high (i.e. the logic value '1').

Likewise, the conversion circuit 332 includes AND gates 421, 422, 423 and 424, an inverter 425, and a D flip flop 426. As shown in FIG. 4, the AND gate 421 receives the inverse of the outputs Q2 and Q4 and the output Q3 while the AND gate 422 receives the inverse of the output Q2 and the outputs Q3-Q4. The AND gate 423 receives the output of the AND gate 421 and the detecting result DR while the AND gate 424 receives the output of the AND gate 422 and the detecting result DR. The D flip flop 426 is triggered by the output of the AND gate 424 and is reset by the output of the AND gate 423. When the coding condition is fit (i.e. the detecting result DR is logic value '1') and the control code (Q2, Q3, Q4) is a code instructing a falling event of the gate control signal TXG (in this embodiment, the control code (Q2, Q3, Q4)=(0,1,0)), the conversion circuit 332 pulls down the gate control signal TXG to the logic low (i.e. the logic value '0'). On the other hand, When the coding condition is fit (i.e. the detecting result DR is logic value '1') and the control code (Q2, Q3, Q4) is a code instructing a rising event of the gate control signal TXG (in this embodiment, the control code (Q2, Q3, Q4) F=(0,1,1)), the conversion circuit 332 pulls up the gate control signal TXG to the logic high (i.e. the logic value '1').

The storage circuit 333 includes AND gates 431 and 432, and a D flip flop 433. The AND gate 431 receives the output Q2 and the inverse of the outputs Q3 and Q4 while the AND gate 432 receives the output of the AND gate 431 and the detecting result DR. The D flip flop 433 is triggered by the output of the AND gate 432 (marked as "OUT432" in FIG. 4). When the coding condition is fit (i.e. the detecting result DR is logic value '1') and the control code (Q2, Q3, Q4) is a code instructing a store operation (in this embodiment, the control code (Q2, Q3, Q4)=(1,0,0)), the storage circuit 333 stores the outputs of the registers 360_1-360_8, i.e. bit<7:0> into a register (not shown in FIG. 4) as a register signal REG<7:0>.

Those skilled in the art should readily understand the control code CC and the corresponding operation in response to the reset control signal RST and the gate control signal TXG shown in the embodiment of FIG. 4 is only for illustrative purpose. With different architecture of the conversion circuits 331 and 332, the control code CC and the corresponding operation in response to the reset control signal RST and the gate control signal TXG might be different. Those skilled in the art should readily understand that the logic gates (e.g. the AND gates shown in FIG. 4) can be easily replaced with different logic gates to achieve the same goal. In addition, the number of the registers included in the latching circuit 310 and the detecting circuit 320 are not limited in the present disclosure. With different registers included in the latching circuit 310, different bit number of the control code CC and the corresponding operation in response to the reset control signal RST and the gate control signal TXG might be acquired. In addition, with more bits included in the control code CC, more signals can be controlled by the logic circuit 330, that is, the logic circuit 330 may control more signals than the reset control signal RST and the gate control signal TXG. These alternative designs shall fall within the scope of the present disclosure.

Refer to FIG. 3 again, the reset circuit 351 of the timing control circuit 130 includes an NAND gate 351_1 which receives the detecting result DR and the clock signal ncki, and the output of the NAND gate 351_1 is coupled to the registers 310_1-310_3 and 320_1-320_2, wherein when the coding condition is fit (i.e. the detecting result is the logic value '1') and the clock signal ncki is logic high, the reset circuit 351 reset the latching circuit 310 and the detecting circuit 320. The reset circuit 352 of the timing control circuit 130 includes an NAND gate 352_1 which receives the output of the AND gate 432 (marked as 'OUT432' in FIG. 3) and the clock signal nckі, the output of the NAND gate 352_1 is coupled to the registers 360_1-360_8, wherein when the output OUT432 is logic high (that is, the control code CC instructs the store operation) and the clock signal ncki is logic high, the reset circuit 352 reset the register circuit 360.

Figure 5:
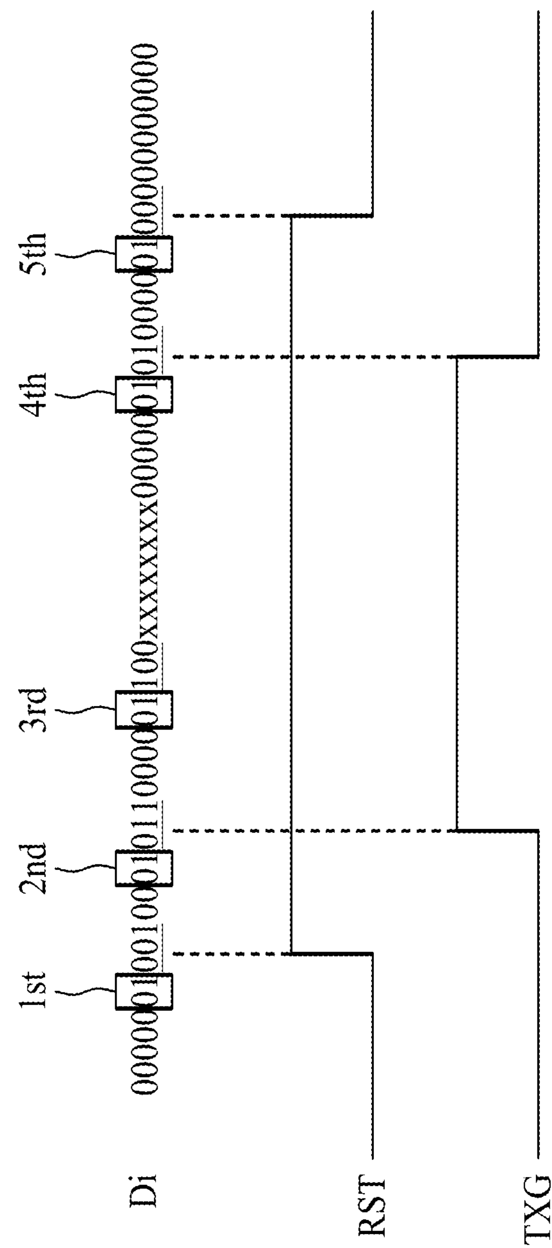
FIG. 5 is a diagram illustrating the operation of generating the reset control signal and the gate control signal based on the input signal according to an embodiment of the present disclosure.

Refer to FIG. 5 in conjunction with FIG. 3 and FIG. 4, wherein FIG. 5 is a diagram illustrating the operation of generating the reset control signal RST and the gate control signal TXG based on the input signal Di according to an embodiment of the present disclosure. As shown in FIG. 5, when the detecting circuit 320 detects consecutive bits (0,1), the next three bits (marked with an underline) currently stored in the latching circuit 310 forms the control code CC to instruct the logic circuit 330 to execute the corresponding conversion operation in response to reset control RST or the gate control signal TXG. For example, for the first time the two consecutive bits (0,1) is detected by the detecting circuit 320, the next three consecutive bits currently stored in the latching circuit 310 are (0,0,1) which is a control code instructing a rising event of the reset control signal RST. Therefore, the reset control signal RST is pulled up to the logic high as shown in FIG. 5. For the second time the two consecutive bits (0,1) is detected by the detecting circuit 320, the next three consecutive bits currently stored in the latching circuit 310 are (0,1,1) which is a control code instructing a rising event of the gate control signal TXG. Therefore, the gate control signal TXG is pulled up to the logic high as shown in FIG. 5. For the third time the two consecutive bits (0,1) is detected by the detecting circuit 320, the next three consecutive bits currently stored in the latching circuit 310 are (1,0,0) which is a control code instructing a store operation. Therefore, the next 8 bits (i.e. bit<7:0> which is marked as 'xxxxxxxx' in FIG. 5) are stored in the register as the register signal REG<7:0>. For the fourth time the two consecutive bits (0,1) is detected by the detecting circuit 320, the next three consecutive bits currently stored in the latching circuit 310 are (0,1,0) which is a code instructing a falling event of the gate control signal TXG. Therefore, the gate control signal TXG is pulled down to the logic low as shown in FIG. 5. For the fifth time the two consecutive bits (0,1) is detected by the detecting circuit 320, the next three consecutive bits currently stored in the latching circuit 310 are (0,0,0) which is a code instructing a falling event of the reset control signal RST. Therefore, the reset control signal RST is pulled down to the logic low as shown in FIG. 5. Therefore, the reset control signal RST and the gate control signal TXG are easily controlled by the single bit digital signal Di.

Figure 6:
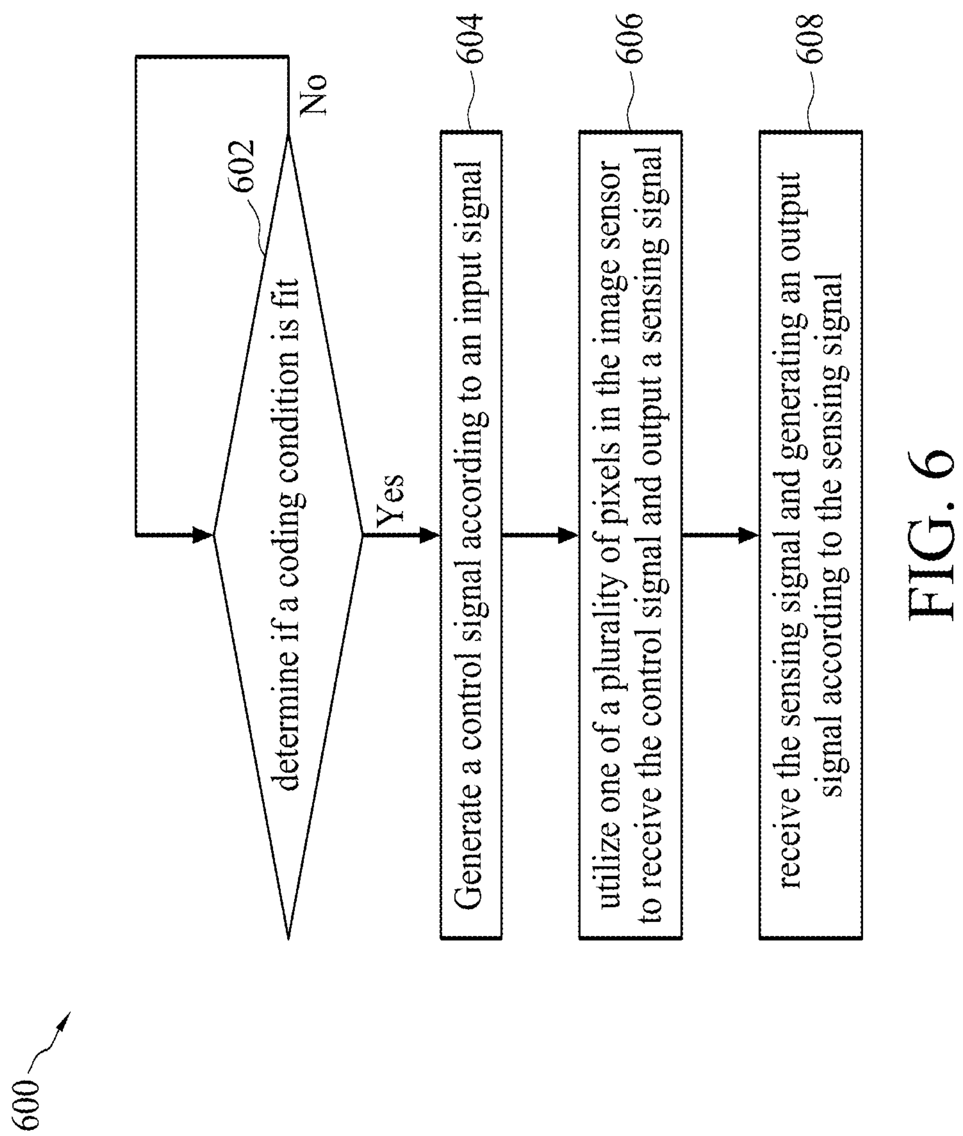
FIG. 6 is a flowchart illustrating a method of the image sensor system according to an embodiment of the present disclosure.

FIG. 6 is a flowchart illustrating a method 600 of the image sensor system 10 according to an embodiment of the present disclosure. Provided that the result is substantially the same, the steps in FIG. 6 are not required to be executed in the exact order. The method is summarized as follows.

Step 602: determine if a coding condition is fit, if yes, go to step 604; otherwise, go to step 602.

Step 604: generate a control signal according to an input signal.

Step 606: utilize one of a plurality of pixels in the image sensor to receive the control signal and output a sensing signal.

Step 608: receive the sensing signal and generate an output signal according to the sensing signal.

Those skilled in the art should readily understand the operation of the method 600 of the image system 10 after reading the embodiments of FIG. 1 to FIG. 5. The detailed description is omitted here for brevity.

In some embodiments, an image sensor system is disclosed. The image sensor system includes a timing control circuit, an image sensor and a modulation circuit. The timing control circuit is arranged to determine if a coding condition is fit according to an input signal, and generate a control signal when the coding condition is fit. The input signal has a signal value updated in response to each pulse of a clock signal. The image sensor is coupled to the timing control circuit. The image sensor includes a plurality of pixels, and one of the plurality of pixels receives the control signal from the timing control circuit and outputs a sensing signal. The modulation circuit is coupled to the image sensor, and arranged to receive the sensing signal and generate an output signal according to the sensing signal.

In some embodiments, a control method of an image sensor system having an image sensor is disclosed. The control method includes: determining if a coding condition is fit according to an input signal, and generating a control signal when the coding condition is fit, wherein the input signal has a signal value updated in response to each pulse of a clock signal; utilizing one of a plurality of pixels in the image sensor to receive the control signal and output a sensing signal; and receiving the sensing signal and generating an output signal according to the sensing signal.

In some embodiments, a timing control circuit of an image sensor system is disclosed. The timing control circuit is arranged to generate a control signal for controlling one or more pixels in an image sensor of the image sensor system. The timing control circuit includes a detecting circuit, a latching circuit and a logic circuit. The detecting circuit is arranged to detect an input signal in response to a first number of pulses of a clock signal to generate a detecting result indicating whether a coding condition is fit. A signal value of the input signal is updated in response to each pulse of the clock signal. The latching circuit is coupled to the detecting circuit, and arranged to latch the input signal in response to a second number of pulses of the clock signal as a control code. The logic circuit is coupled to the detecting circuit and the latching circuit. When the detecting result indicates that the coding condition is fit, the logic circuit is arranged to execute a conversion operation upon the control code to generate the control signal for controlling the one or more pixels.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image sensor system, comprising:

a timing control circuit, arranged to determine if a coding condition is fit according to an input signal, the timing control circuit generating a control signal when the coding condition is fit, wherein the input signal has a signal value updated in response to each pulse of a clock signal;

an image sensor, coupled to the timing control circuit, wherein the image sensor comprises a plurality of pixels, and one of the plurality of pixels receives the control signal from the timing control circuit and outputs a sensing signal; and a modulation circuit, coupled to the image sensor, wherein the modulation circuit is arranged to receive the sensing signal and generate an output signal according to the sensing signal.

2. The image sensor system of claim 1, wherein the timing control circuit is configured to, in response to each pulse of the clock signal, receive a bit as a portion of the input signal to update the signal value of the input signal.

3. The image sensor system of claim 1, wherein when the coding condition is fit, the timing control circuit is arranged to generate the control signal according to a control code of the input signal; and the control code comprises a plurality of consecutive bits of the input signal.

4. The image sensor system of claim 1, wherein the control signal is a gate control signal, and is arranged to control a switch of each of the plurality of pixels in the image sensor to transmit a charge on a diode of each pixel in the image sensor to a control node in each pixel in the image sensor.

5. The image sensor system of claim 1, wherein the control signal is a reset signal, and is arranged to reset a control node in each pixel in the image sensor.

6. The image sensor system of claim 1, wherein when the coding condition is fit, the timing control circuit is further arranged to store a data package of the input signal; and the data package comprises a plurality of consecutive bits of the input signal.

7. The image sensor system of claim 1, wherein the coding condition is fit when a plurality of consecutive bits of the input signal has a predetermined bit pattern.

8. The image sensor system of claim 1, wherein the timing control circuit comprises:

a latching circuit, arranged to latch first consecutive bits of the input signal as a control code;

a detecting circuit, coupled to the latching circuit, wherein the detecting circuit is arranged to detect second consecutive bits of the input signal to generate a detecting result indicating whether the coding condition is fit; and a logic circuit, coupled to the detecting circuit and the latching circuit, wherein when the detecting result indicates that the coding condition is fit, the logic circuit is arranged to execute a conversion operation upon the control code to generate the control signal.

9. The image sensor system of claim 8, wherein when the coding condition is fit and the control code has a predetermined code value, the logic circuit is further arranged to store third consecutive bits of the input signal; the third consecutive bits follow the first consecutive bits of the input signal.

10. The image sensor system of claim 8, wherein the timing control circuit further comprises:

a reset circuit, coupled to the detecting circuit and the latching circuit, wherein when the detecting result indicates that the coding condition is fit, the reset circuit is arranged to reset the detecting circuit and the latching circuit.

11. The image sensor system of claim 1, wherein a frequency of the output signal is different from than a frequency of the sensing signal.

12. A control method of an image sensor system comprising an image sensor, comprising:

determining if a coding condition is fit according to an input signal, and generating a control signal when the coding condition is fit, wherein the input signal has a signal value updated in response to each pulse of a clock signal;

utilizing one of a plurality of pixels in the image sensor to receive the control signal and output a sensing signal; and receiving the sensing signal and generating an output signal according to the sensing signal.

13. The control method of claim 12, further comprising:

in response to each pulse of the clock signal, receiving a bit as a portion of the input signal to update the signal value of the input signal.

14. The control method of claim 12, wherein generating the control signal comprises:

when the coding condition is fit, generating the control signal according to a control code of the input signal, the control code comprising first consecutive bits of the input signal.

15. The control method of claim 14, wherein generating the control signal further comprises:

detecting second consecutive bits of the input signal to generate a detecting result indicating whether the coding condition is fit;

latching the first consecutive bits of the input signal as the control code, wherein the first consecutive bits follow the second consecutive bits in the input signal; and when the detecting result indicates that the coding condition is fit, executing a conversion operation upon the control code to generate the control signal.

16. The control method of claim 12, further comprising:

utilizing the control signal to control a switch of a pixel in the image sensor to transmit a charge on a diode of the pixel to a control node in the pixel.

17. The control method of claim 12, further comprising:

utilizing the control signal to reset a control node in a pixel in the image sensor.

18. The control method of claim 12, wherein the coding condition is fit when a plurality of consecutive bits of the input signal has a predetermined bit pattern.

19. A timing control circuit of an image sensor system, the timing control circuit being arranged to generate a control signal for controlling one or more pixels in an image sensor of the image sensor system, the timing control circuit comprising:

a detecting circuit, arranged to detect an input signal in response to a first number of pulses of a clock signal to generate a detecting result indicating whether a coding condition is fit, wherein a signal value of the input signal is updated in response to each pulse of the clock signal; and a latching circuit, coupled to the detecting circuit, wherein the latching circuit is arranged to latch the input signal in response to a second number of pulses of the clock signal as a control code; and a logic circuit, coupled to the detecting circuit and the latching circuit, wherein when the detecting result indicates that the coding condition is fit, the logic circuit is arranged to execute a conversion operation upon the control code to generate the control signal for controlling the one or more pixels.

20. The timing control circuit of claim 19, wherein the timing control circuit further comprises:

a reset circuit, coupled to the detecting circuit and the latching circuit, wherein when the detecting result indicates that the coding condition is fit, the reset circuit is arranged to reset the detecting circuit and the latching circuit.

* * * * *